US 6,548,754 B2

(12) United States Patent
Miksch

(10) Patent No.: US 6,548,754 B2
(45) Date of Patent: Apr. 15, 2003

(54) METHOD AND APPARATUS OF MANAGING CABLING IN AN OPTIONAL DRIVE FILLER

(75) Inventor: Eugene A Miksch, Loveland, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/919,012

(22) Filed: Jul. 31, 2001

(65) Prior Publication Data

US 2003/0024722 A1 Feb. 6, 2003

(51) Int. Cl.[7] ................................................ H01J 15/00
(52) U.S. Cl. ..................... 174/50; 174/63; 174/DIG. 9; 220/4.02; 312/223
(58) Field of Search ....................... 174/63, 50, DIG. 9, 174/53, 17 R, 58; 312/222, 223, 333; 220/4.02; 439/535; 248/906

(56) References Cited

U.S. PATENT DOCUMENTS

| | | | | |
|---|---|---|---|---|
| 3,792,189 A | * | 2/1974 | Stengel et al. ......... 174/DIG. 9 |
| 5,149,017 A | * | 9/1992 | McEntire et al. ...... 174/DIG. 9 |
| 6,175,079 B1 | * | 1/2001 | Johnston et al. ............... 174/50 |
| 6,291,767 B1 | * | 9/2001 | Beecher et al. ............... 174/50 |
| 6,375,287 B1 | * | 4/2002 | Lai ........................ 312/222 X |
| 6,431,667 B1 | * | 8/2002 | Okumura ..................... 312/222 |
| 6,486,397 B2 | * | 11/2002 | Lee .............................. 174/50 |

* cited by examiner

Primary Examiner—Dean A. Reichard
Assistant Examiner—Dhiru R Patel

(57) ABSTRACT

An apparatus is provided for storing and accessing a cable within a chassis. The apparatus comprises a filler drive drawer having a base shelf, an upper biasing arm disposed on the base shelf and a pair of resilient raised arm members positioned on the base shelf laterally on opposite sides of the upper biasing arm. The upper biasing arm has a flange that extends upward from the base shelf and a cantilever member extending therefrom. The cantilever member extends at least partially downward to provide an upper contact surface for a cable connector positioned below the upper biasing arm. The upper biasing arm and pair of resilient arm members are cooperatively arranged to releasably engage the cable connector within the filler drive drawer. The drawer can easily be slid into or out of the chassis to access the cable connector.

17 Claims, 3 Drawing Sheets

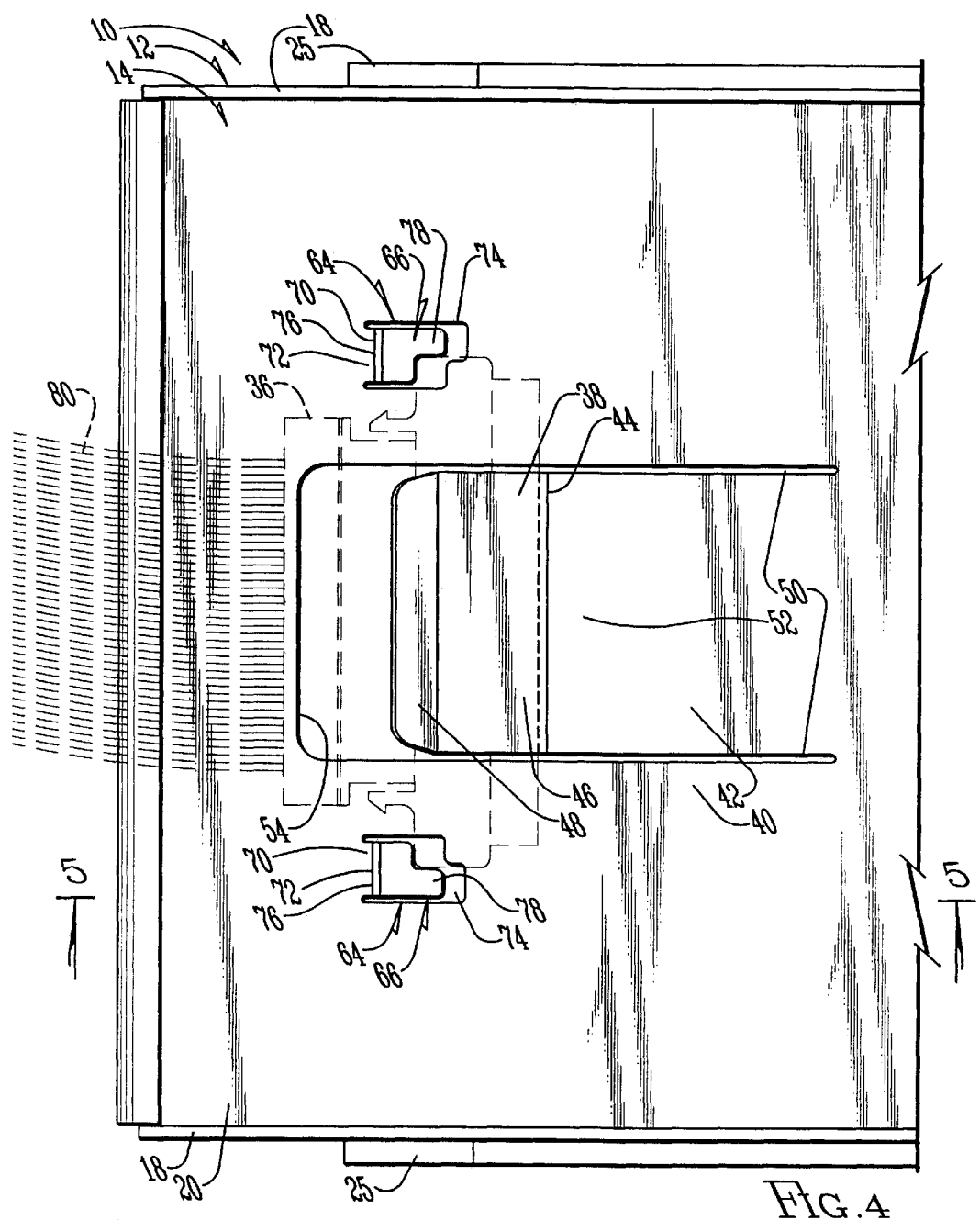
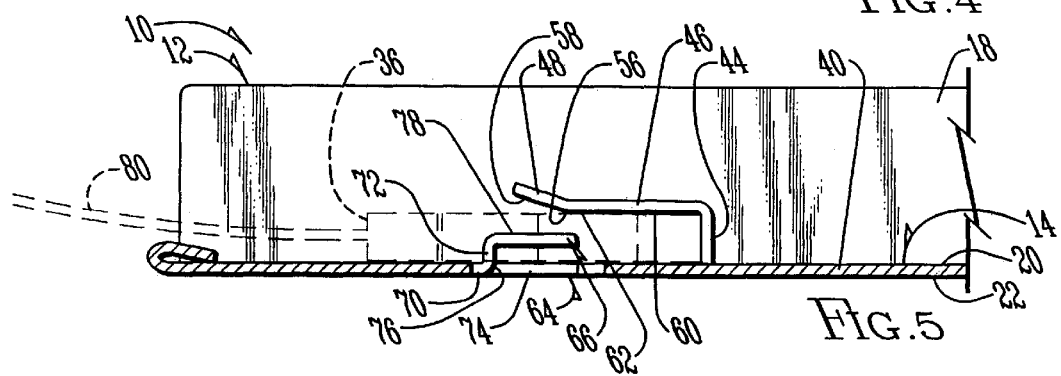

METHOD AND APPARATUS OF MANAGING CABLING IN AN OPTIONAL DRIVE FILLER

BACKGROUND OF THE INVENTION

This invention relates generally to an apparatus for facilitating access to a cable within a chassis and, more particularly, to an apparatus for securing a computer cable connector within a chassis drawer to allow for convenient storage and retrieval of the cable.

DESCRIPTION OF THE RELATED ART

Data and power cables are provided in computer systems to facilitate the interfacing of optional drive units, or peripheral devices, such as CD or DVD-ROM drives, Digital Audio Tape drives, and other memory units, with a central processing unit (CPU) and related circuitry. These drive units are typically slid into a bay of a computer chassis when in use and removed from the chassis when needed for use with another computer system or server. Standard drive unit designs require the cables to be connected to the back of the units when in use. Such cables are routed generally from the back of the device bay through the chassis to the motherboard or other circuitry. Thus, these cables are not easy accessible when a standard cover is placed over the computer chassis.

When a drive unit is removed from a chassis, the attached cable connector extends from the chassis and is removed. Unless another drive unit is then connected to the cable and inserted into the chassis, the user must find a location to place the connector when not in use. If the connector is merely placed in the empty bay of the chassis, it is not securely held in place and could move within the chassis to a location that is difficult to access. Further, having a user search within the chassis or remove a cover to access the cables introduces the risk of electric shock or other hazards, and increases the likelihood of damage to the computer by mishandling component parts. Additionally, the alternative solution of having the cable extend out of the bay when not in use is not aesthetically pleasing, and the connector could interfere with the function of adjacent components.

Thus, what is needed is an device to securely position a cable connector within a drawer of a chassis bay when not in use, and allow for convenient access to the cable connector when it is desired to be used with a drive unit. Such a device should have a drawer frame such that it can be slid into and out of a chassis bay while providing a neat appearance. The device should provide a simple engaging means to hold connectors of various sizes in fixed position in the drawer, the engaging means also allowing for the easy removal of the connector. Further, the device should ensure that the cable does not interfere with other drive units or components located within the chassis of a computer system.

SUMMARY OF THE INVENTION

It is therefore an object of the present invention to provide a cable storage and retrieval device for insertion into a drive bay of a computer chassis to securely hold a computer cable. It is a further object of the present invention to limit the movement of the cable connector. It is yet another object of the present invention to provide such an assembly that provides a pleasing appearance for a chassis bay that is devoid of a drive unit, and prevents the cable from moving into a portion of a chassis that is difficult to access.

These and other objects are afforded by the present invention providing a cable storage and retrieval device for securing the position of an unused cable within the bay of a chassis. The device comprises a base shelf, an upper biasing arm extending from the base shelf to overlie a cable connector, and raised arm members spaced laterally from the upper biasing arm along the base shelf and configured to underlie the cable connector, the upper biasing arm and raised members provide opposing forces to securely position, and engage with, the cable connector.

The base shelf has a front face that is sized and configured to mimic the front face of a typical drive unit, and side walls to assist in sliding the present invention into the bay of a chassis. The base shelf, front face and side walls form the frame for the optional drive filler.

The upper biasing arm has a vertical flange extending from the base shelf, a cantilever member extending from the top of the vertical flange and angled at least partially downwardly, and a releasing lip connected to the cantilever member. The cantilever member provides a channel for securely capturing a cable connector.

The raised arm members are generally positioned each on opposing sides of the upper biasing arm along the base shelf. The raised arm members comprise a resilient member extending across an opening of the base shelf, a second flange extending from the resilient member and angled in an upward fashion, and a cantilever member extending generally horizontally from the second flange. The cantilever member provides a resilient lower surface for capturing the cable connector.

Deflection of the upper biasing arm and the raised arms upon insertion of the cable connector creates an interference fit to secure the cable connector. By lifting upward on the releasing lip, the downward biasing force applied to the cable connector can be counteracted and the connector removed from the engaged position.

Other advantages and components of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 4 is a top plan view of the cable storage and retrieval device; and

FIG. 5 is a cross sectional view taken along line 5—5 of FIG. 4.

DETAILED DESCRIPTION OF THE INVENTION

Figure 1:
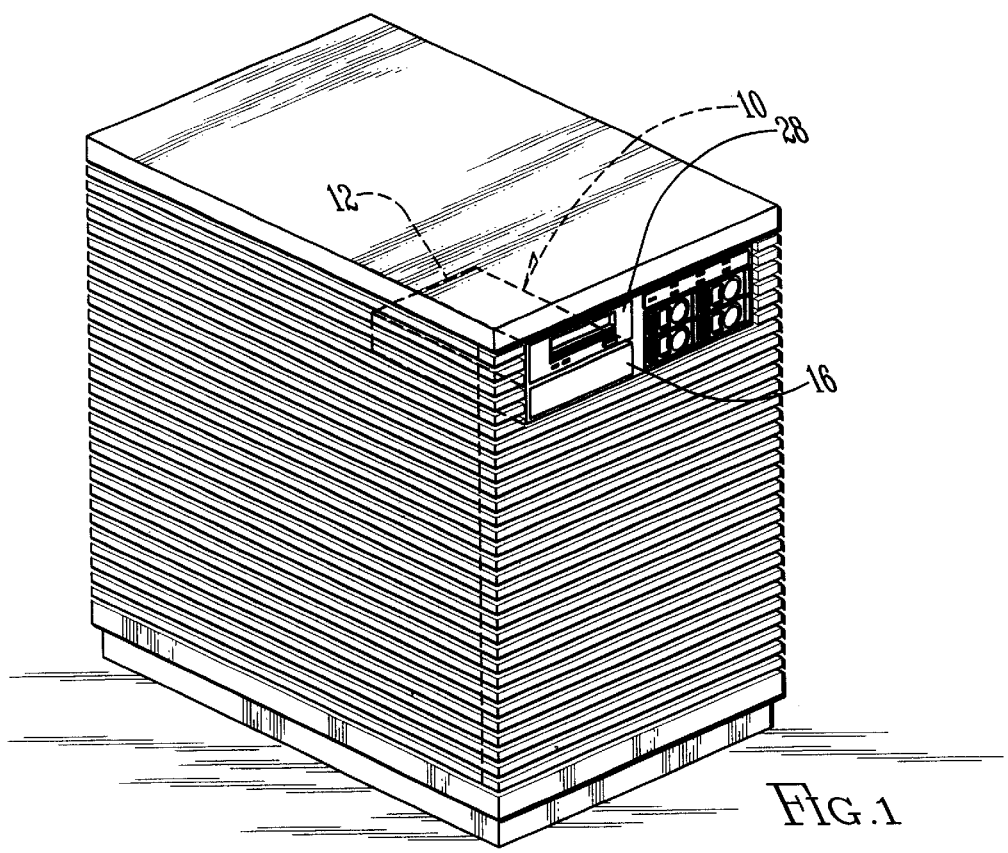
FIG. 1 is a perspective view showing a cable storage and retrieval device in accordance with the present invention housed in a computer chassis.
Figure 2:
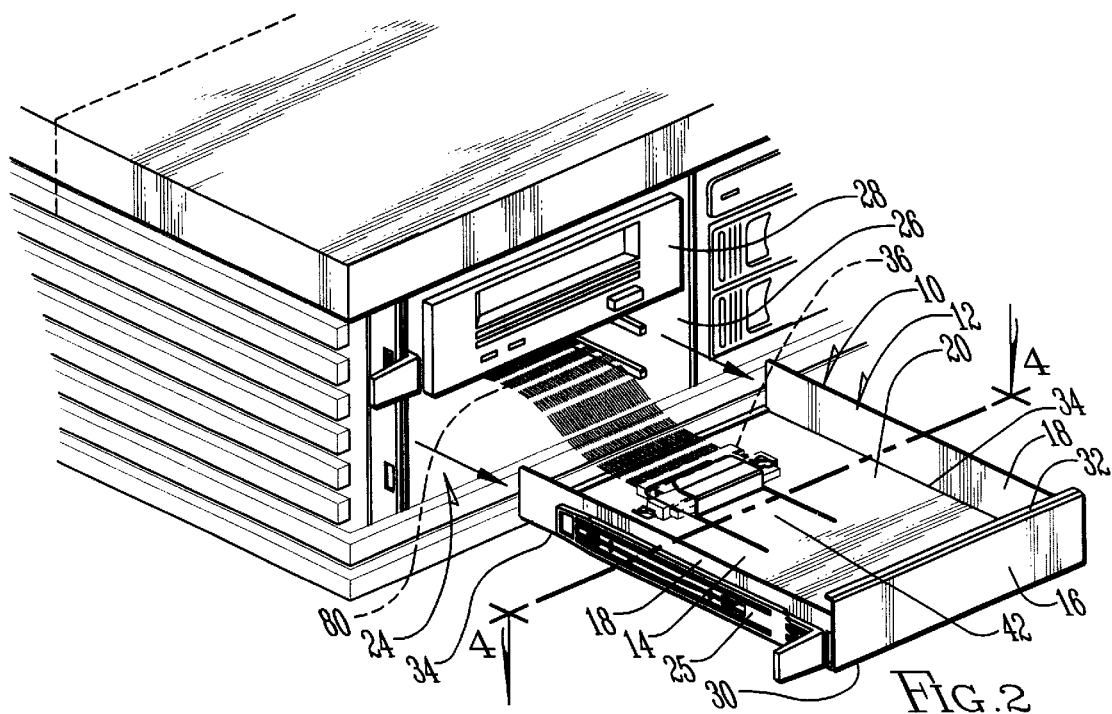
FIG. 2 is a perspective view showing the cable storage and retrieval device removed from a computer chassis.
Figure 3:
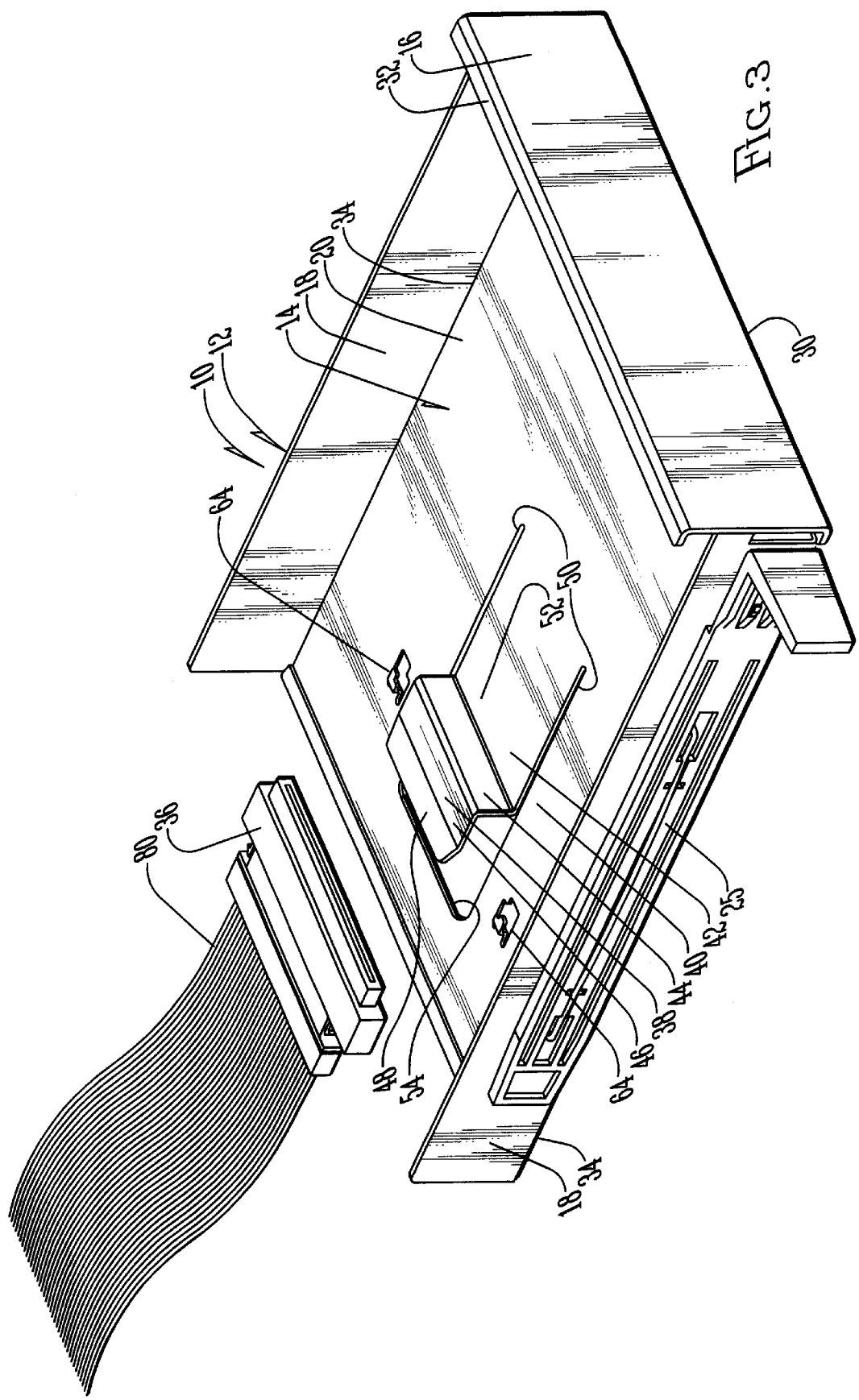
FIG. 3 is a perspective view showing a cable storage and retrieval device with the cable connector removed.

A cable storage and retrieving device of the present invention is presented generally at 10. As shown in FIG. 3, the device includes a drawer frame 12 having a base shelf 14, a front face 16 and side walls 18. The base shelf 14 provides a generally rectangular, planar top surface 20 for an upper biasing arm 38 and a pair of resilient arm members 64 to be formed. The upper biasing arm 38 and resilient arm members 64 define a channel 45 for receiving a cable connector of the computer or network server chassis.

The base shelf 14 is configured to be received slidably within a bay 24 of a computer chassis 26 by a pair of guide rails 25, and generally has the same dimensions as the bottom surface of a typical drive unit 28. The front face 16 extends perpendicularly from a forward end 30 of the base shelf 14 and generally spans the height and width of the device bay 24. Preferably, the front face 16 includes a lip 32 on an upper edge of the front face to provide a gripping surface to aid the user in inserting and removing the drawer 12 from the device bay 24. Side walls 18 extend perpendicularly from side edges 34 of the base shelf 14 and provide a mounting surface for the guide rails 25. The drawer frame 12 and its components can be formed from metals, such as aluminum, and other materials, but preferably are made of plastic.

The upper biasing arm 38 is formed generally at a mid-section 40 of the base shelf 14 and comprises a flexion member 42, a first flange 44, an upper cantilever member 46 and a releasing lip 48, The flexion member 42 of the upper biasing arm 38 preferably extends in the plane of the base shelf 14, and is defined by a pair of parallel slots 50. The flexion member 42 has a free end 52 and the width of the flexion member is of a sufficient dimension such that the biasing arm 38 can secure a portion of the cable connector 36 The slots 50 extend through the base shelf 14 from the top surface 20 to the bottom surface 22 and are of a sufficient length as to provide flexion for the biasing arm 38 to allow a cable connector 36 to be secured in an interference fit.

The base shelf 14 further includes an opening 54 positioned below the upper cantilever member 46 and the releasing lip 48. The opening 54 is generally square or rectangular in shape and extends through the base shelf 14 from the top surface 20 to the bottom surface 22. The opening 54 is bounded along its perimeter by the free end 52 of the flexion member 42 on one side, and by the base shelf 14 on the remaining sides. The opening 54 is configured to be smaller than the cable connector 36.

In an alternative embodiment, the first flange 44 of the upper biasing arm 38 extends from the base shelf 14. First flange 44 or the upper cantilever member 46 are constructed of a resilient material to have sufficient flexibility to accommodate the cable connector 36 positioned below the upper cantilever member 46 in an interference fit.

The first flange 44 of the upper biasing arm 38 extends generally upward from the free end 52 of the flexion member 42, and preferably is perpendicular to the flexion member and the base surface 12. The upper cantilever member 46 extends from the top of the first flange 44 and is angled at least partially downward to provide a positive downward biasing force when a connector 36 inserted below the upper cantilever member 46. Preferably, a releasing lip 48 extends from a lower free end 56 of the upper cantilever member 46 and provides an upwardly angled flange having a lower manipulation surface 58. First flange 44, upper cantilever member 46 and base surface 12 define a channel 45 to receive cable connector 36.

To release a cable connector 36 from an interference fit below the upper cantilever member 46, the manipulation surface 58 of the lip is lifted to deflect the upper biasing arm 38 a sufficient distance as to reduce or remove the biasing force on the connector 36.

The lower surface 60 of the upper cantilever member 46 provides an upper interfacing point 62 for contacting the cable connector 36 from above. The upper interfacing point 62 is preferably located at the lowest point on the upper cantilever member 46, and can be located at the lower free end 56 connecting the releasing lip 48 and the upper cantilever member 46.

Preferably, a pair of raised resilient arm members 64 are provided to cooperatively function with the upper biasing a 38 to engage the cable connector 36. The arm members 64 contact the underside of connector 36 and provide an opposing force to the downward biasing force of the upper biasing arm 38. The arm members 64 present a similar configuration as the upper biasing arm and each comprise a flexion member 70, a second flange 72, and a lower cantilever member 66. The flexion member 70 of each arm member 64 extends generally in a horizontal plane from the perimeter of an opening 74 in the base shelf 14 and provides a flexion area for the arm member 64. The second flange 72 extends generally upward from the free end 76 of the flexion member 70, and preferably is perpendicular to the flexion member 70 and the base shelf 14. The height of the second flange 72 is sufficient to raise the lower cantilever member 66 above the base shelf top surface 20 such that the engaged cable connector 36 is secured by the resilient arm members 64 providing an opposing force to the biasing force of the upper biasing arm 38. The lower cantilever member 66 is connected to the top of the second flange 72 and extends generally in the horizontal plane when the arm member 64 is unflexed The shape of the lower cantilever member 66 can be rectangular, or any other shape that facilitates contacting and holding the lower surface of a cable connector 36. Further, the upper surface 78 of the lower cantilever member 66 provides a lower interfacing point 41 for, contacting the cable connector 36 from below.

Arm members 64 are spaced laterally along the base shelf 14 on opposite sides of the upper biasing arm 38 and opening 54. The positioning of the raised members 64 is designed to provide a stable platform for a cable connector 36 to oppose the biasing force of the upper biasing arm.

In operation of the present invention an empty device bay 24 of a chassis 26 is provided with a computer cable 80. The drawer frame 12 is provided for slidable insertion into the empty device bay 24 to securely position the cable connector 36 at the end of the cable 80. Prior to inserting the drawer 12, the cable connector 36 is inserted into the channel 45 until the connector 36 contacts the first flange 44 of the upper biasing arm 38 and is thus fully engaged Because the vertical space of the channel 45 is configured to span a height that is less than the connector 36 height, an interference fit is created with the upper biasing arm 28 and the arm members 64. The height of the connector 36 will determine how much the upper biasing arm 38 deflects upward and arm members 64 deflect downward. At the point of full engagement of the connector 36, the upper biasing arm 38 transfers a downward biasing force, and the arm members 64 transfer an upward biasing force, to the connector 36 and thus securely retain the connector. The drawer 12 and engaged cable connector 36 are slid into the bay of the chassis 26 for storage.

When it is desired to place a drive unit 28 in the chassis 26 for use, the drawer 12 can be at least partially slid out of the bay 24 so that the engaged cable connector 36 can be accessed. To disengage the connector 36, an upward force is applied to the manipulation surface 58 of the releasing lip 48 to deflect the upper biasing arm 38 a sufficient distance as to reduce the downward biasing force on the connector. At this point, the connector 36 can be slid out from underneath the upper cantilever member 46 and removed from the drawer 12. The drawer 12 is then fully removed from the bay 24 and the cable connector 36 can be secured to the back of the desired drive unit 28. Finally, the drive unit 28 and attached cable 80 are inserted into the bay 24 for use with a computer system.

In addition to the embodiments described above, the current invention can have alternative features. For example, the upper biasing arm 38 can be configured to extend horizontally from the side walls 18 or front face 16 at a distance above the base shelf 14 such that the parallel slots 50 and opening 24 would be unnecessary to promote flexion of the upper biasing arm 38. In another configuration, the arm members 64 could merely be spaced protrusions extending above the base shelf 14 to provide a foundation for supporting the underside of the cable connectors 36 and opposing the biasing force of the upper biasing arm 38. Also, the upper biasing arm 38 and arm members 64 could be configured to securely position the flexible portion of a computer cable 80 besides the end connector 36. Furthermore, the present invention could be provided without a drawer frame 12 such that the upper biasing arm 38 and arm members 64 are mounted on any surface where it is desired to secure the position of a cable connector 36. Still further, it is to be recognized that the present invention can be used with various cables besides merely computer cables, including any type of data or power carrying cables.

From the forgoing information, it should now be obvious that the cable storage and retrieving device 10 provides a convenient, reliable, and aesthetically pleasing solution for positioning a computer cable 80 within the device bay 24 of a computer chassis 82. The device 10 provides a simple and safe method for securely storing a cable connector 36 when not in use and retrieving the connector 36 when it is desired to be used with a drive unit 28. It is to be understood that the upper biasing arm 38 and resilient arm members 64 can have a number of configurations so long as they combine to releasably engage a cable connector 36 within a drawer 12. Furthermore, while certain forms of the present invention have been illustrated and described herein, it is not to be limited to the specific forms or arrangement of parts described and shown.

What is claimed is:

1. A chassis drawer and holding device for storing and accessing a cable, the chassis drawer comprising:
   a substantially planar base shelf;
   an upper biasing arm comprising a first flange extending upward from an upper surface of the base shelf, and an upper cantilever member attached to the first flange and having a free end, the upper cantilever member extending at a less than perpendicular angle from the first flange towards the free end;
   at least one resilient arm member attached to the base shelf, the at least one resilient arm member being below the upper biasing arm wherein the upper biasing arm and the at least one resilient arm member are cooperatively arranged to releasably engage a portion of a cable.

2. The chassis drawer of claim 1, wherein a portion of a cable connector is releasably engaged by the upper biasing arm and the at least one resilient arm member.

3. The chassis drawer of claim 1, wherein the at least one resilient arm member extends above the base shelf upper surface.

4. The chassis drawer of claim 3, wherein the base shelf has an opening below at least a portion of the at least one resilient arm member and configured to receive said portion of the resilient arm member.

5. The chassis drawer of claim 4, wherein the at least one resilient arm member comprises a pair of resilient arm members, each of said pair of resilient arm members having a first flexion member, a second flange extending upwardly from the first flexion member, and a lower cantilever member.

6. The chassis drawer of claim 5, wherein the lower cantilever member of each of said pair of resilient arm members extends in a generally horizontal plane, the lower cantilever member having an upper interfacing surface for abutting said portion of the cable.

7. The chassis drawer of claim 6, wherein the lower cantilever member of each of said pair of resilient arm members is positioned above the base shelf upper surface.

8. The chassis drawer of claim 1, wherein the upper biasing arm flange is positioned perpendicular to the base shelf.

9. The chassis drawer of claim 1, wherein the base shelf has a pair of substantially parallel slots extending from a base of the first flange in a direction opposite of the upper cantilever member, the slots defining a second flexion member for the upper biasing arm.

10. The chassis drawer of claim 1, wherein the upper biasing arm further comprises a releasing lip extending upward from the upper cantilever member.

11. The chassis drawer of claim 10, whereby the upper cantilever member of the upper biasing arm and the releasing lip interconnect to form a convex interfacing point for abutting said portion of the cable.

12. The chassis drawer of claim 1, further comprising a front panel extending vertically from a forward end of the base shelf to present a panel face for the chassis drawer.

13. A system for securing an unused cable connector, the system comprising:
    a substantially planar base shelf;
    an upper biasing arm comprising a first flange extending upward from au upper surface of the base shelf, and an upper cantilever member attached to the first flange and being partially downwardly angled; and
    at least two resilient arm members attached to the base shelf, the at least two resilient arm members being spaced laterally across the base shelf on opposite sides of the upper biasing arm, whereby the upper biasing arm and the at least two resilient arm members are cooperatively arranged to releasably engage with a portion of a cable.

14. The system of claim 13, wherein the at least two resilient members and the upper biasing arm define a channel for receiving said portion of a cable.

15. The system of claim 13, whereby the upper biasing arm is operably configured to provide a first biasing force towards the upper surface of the base shelf and the at least two resilient arm members are operably configured to provide a second biasing force away from the upper surface of the base shelf, the first and second biasing forces being in an opposed arrangement to secure the position of said portion of a cable placed between the upper biasing arm and the at least two resilient arm members.

16. The system of claim 13, wherein the base shelf has a pair of horizontal, parallel slots extending from a lower end of the upper biasing arm in a direction opposite of the upper cantilever member to facilitate displacement of the upper biasing arm when said portion of a cable is positioned in an interference fit between the tipper cantilever member and the at least two resilient arm members.

17. A method for positioning and storing a portion of a cable in a chassis, the method comprising the steps of:
    inserting a portion of a cable between an upper biasing arm and a pair of resilient arm members, the upper biasing arm comprising a first flange extending upward from an upper surface of a base shelf of a drawer, and an upper cantilever member attached to the flange and having a free end, the pair of resilient arm members being below the upper biasing arm, the upper biasing am and the pair of resilient arm members extending above the upper surface of the base shelf and the pair of resilient arm members being spaced laterally across the base surface on opposite sides of the upper biasing arm, at least one of the upper biasing arm or pair of resilient arm members being capable of deflecting to facilitate engagement with said portion of a cable; and sliding the drawer into a chassis to store the cable.

* * * * *

UNITED STATES PATENT AND TRADEMARK OFFICE
CERTIFICATE OF CORRECTION

PATENT NO. : 6,548,754 B2
DATED : April 15, 2003
INVENTOR(S) : Eugene A. Miksch

It is certified that error appears in the above-identified patent and that said Letters Patent is hereby corrected as shown below:

<u>Column 6,</u>
Line 31, delete "au" and insert therefor -- an --
Line 58, delete "tipper" and insert therefor -- upper --

Signed and Sealed this

Twelfth Day of October, 2004

JON W. DUDAS
*Director of the United States Patent and Trademark Office*